United States Patent
Montoro

(10) Patent No.: US 9,135,439 B2
(45) Date of Patent: Sep. 15, 2015

(54) METHODS AND APPARATUS TO DETECT RISKS USING APPLICATION LAYER PROTOCOL HEADERS

(71) Applicant: Rodrigo Ribeiro Montoro, Jurere-Florianopolis (BR)

(72) Inventor: Rodrigo Ribeiro Montoro, Jurere-Florianopolis (BR)

(73) Assignee: Trustwave Holdings, Inc., Chicago, IL (US)

( * ) Notice: Subject to any disclaimer, the term of this patent is extended or adjusted under 35 U.S.C. 154(b) by 131 days.

(21) Appl. No.: 13/839,810

(22) Filed: Mar. 15, 2013

(65) Prior Publication Data

US 2014/0101764 A1     Apr. 10, 2014

Related U.S. Application Data

(60) Provisional application No. 61/710,223, filed on Oct. 5, 2012.

(51) Int. Cl.
　　*G06F 21/56*　　(2013.01)
　　*H04L 29/06*　　(2006.01)
　　*H04L 29/08*　　(2006.01)

(52) U.S. Cl.
　　CPC .............. *G06F 21/56* (2013.01); *H04L 63/145* (2013.01); *H04L 67/02* (2013.01)

(58) Field of Classification Search
　　CPC ....... G06F 21/56; H04L 63/00; H04L 63/145; H04L 67/02
　　USPC ..................................................... 726/23–24
　　See application file for complete search history.

(56) References Cited

U.S. PATENT DOCUMENTS

| | | | |
|---|---|---|---|
| 7,191,468 B2 | 3/2007 | Hanner | |
| 7,392,541 B2 | 6/2008 | Largman et al. | |
| 7,472,284 B2 | 12/2008 | Shipp | |
| 7,975,305 B2 | 7/2011 | Rubin et al. | |
| 8,181,246 B2 | 5/2012 | Shulman et al. | |
| 8,244,799 B1 | 8/2012 | Salusky et al. | |
| 8,307,099 B1 * | 11/2012 | Khanna et al. | 709/229 |
| 8,341,724 B1 | 12/2012 | Burns et al. | |
| 8,510,548 B1 * | 8/2013 | Markov et al. | 713/150 |
| 8,806,641 B1 * | 8/2014 | Li et al. | 726/24 |
| 2003/0023873 A1 | 1/2003 | Ben-Itzhak | |
| 2003/0065926 A1 | 4/2003 | Schultz et al. | |
| 2006/0095969 A1 | 5/2006 | Portolani et al. | |
| 2007/0094734 A1 * | 4/2007 | Mangione-Smith et al. | 726/24 |
| 2008/0046565 A1 | 2/2008 | Liu | |

(Continued)

OTHER PUBLICATIONS

Fielding et al., RFC 2616—Hypertext Transfer Protocol—HTTP/1.1, Jun. 1999.*

(Continued)

*Primary Examiner* — Chau Le
(74) *Attorney, Agent, or Firm* — Hanley Flight & Zimmerman, LLC

(57) ABSTRACT

Methods, apparatus, systems and articles of manufacture to detect risks using application protocol headers are disclosed. An example method includes extracting characteristics from a header of a received hypertext transport protocol (HTTP) request, determining a first score corresponding to a first characteristic of the characteristics, determining a second score corresponding to a second characteristic of the characteristics, adding the first score and the second score to determine a combined score, and indicating that the received HTTP request is malware when the combined score meets a threshold.

27 Claims, 4 Drawing Sheets

(56) References Cited

U.S. PATENT DOCUMENTS

| | | |
|---|---|---|
| 2008/0134331 A1* | 6/2008 | Sung Won et al. .............. 726/22 |
| 2008/0320567 A1 | 12/2008 | Shulman et al. |
| 2009/0133125 A1* | 5/2009 | Choi et al. ...................... 726/24 |
| 2010/0306537 A1 | 12/2010 | Cohen |
| 2011/0282908 A1 | 11/2011 | Fly et al. |
| 2011/0283356 A1 | 11/2011 | Fly et al. |
| 2011/0307955 A1 | 12/2011 | Kaplan et al. |
| 2011/0307956 A1 | 12/2011 | Yermakov et al. |
| 2012/0143650 A1 | 6/2012 | Crowley et al. |
| 2012/0297457 A1* | 11/2012 | Schulte et al. ................... 726/4 |
| 2012/0306537 A1 | 12/2012 | Chou et al. |
| 2013/0081142 A1* | 3/2013 | McDougal et al. ............. 726/24 |
| 2013/0097705 A1 | 4/2013 | Montoro |
| 2013/0111053 A1* | 5/2013 | Perreault et al. .............. 709/231 |

OTHER PUBLICATIONS

Genser, Michelle, "Trustwave SpiderLabs to Present at SecTor 2011", posted on Oct. 13, 2011, 2 pages.

Kerner, Sean Michael, "Detecting Malicious Traffic in HTTP Headers," InternetNews.com, Oct. 19, 2011, 1 page.

* cited by examiner

METHODS AND APPARATUS TO DETECT RISKS USING APPLICATION LAYER PROTOCOL HEADERS

RELATED APPLICATION

This application claims the benefit of U.S. Provisional Application No. 61/710,223, entitled "DETECTING MALWARE WITH HTTP HEADER SCORING, which was filed on Oct. 5, 2012 and is hereby incorporated herein by reference it its entirety.

FIELD OF THE DISCLOSURE

This disclosure relates generally to network communications, and, more particularly, to methods and apparatus to detect risks using application layer protocol headers.

BACKGROUND

In recent years, the amount of malware network communications (e.g., hypertext transport protocol (HTTP) communications, HTTP secure (HTTPS) communications utilizing secure socket layer (SSL), etc.) has grown. As used herein, malware can include network communications sent with a malicious intent (e.g., unauthorized communications, communications sent from an unauthorized person, communications include harmful content such as viruses, communications attempting to illegitimately retrieve private and information, etc.) and communications sent without a malicious intent (e.g., communications including an error, communications sent to an incorrect address, etc.). Malware network communications, especially malware network communications having a malicious intent, can cause damage to servers and other network equipment, interfere with valid network communications, and so forth.

Figure 1:
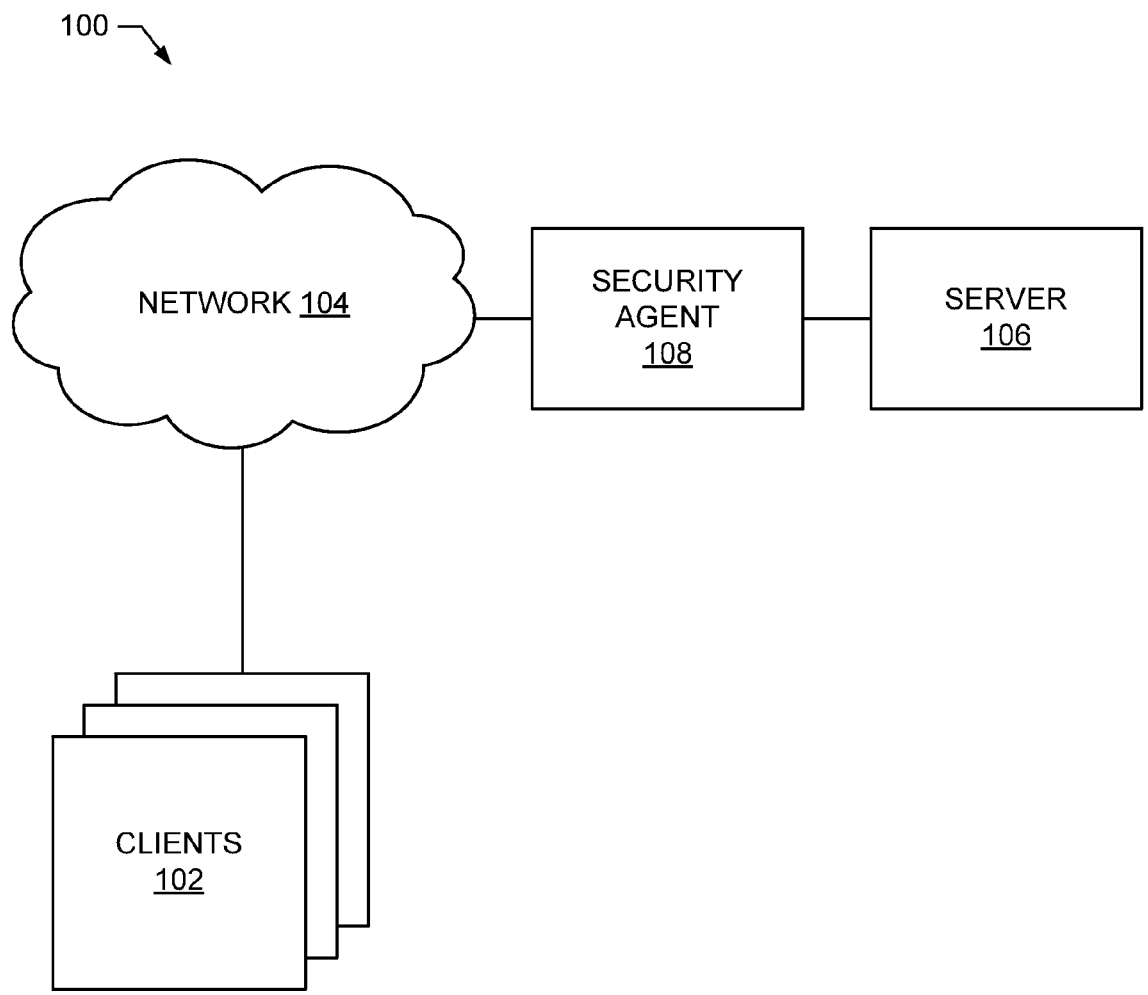
FIG. 1 is a block diagram of an example system 100 for detecting risks using application layer protocol headers.

The figures are not to scale. Instead, to clarify multiple layers and regions, the thickness of the layers and regions may be enlarged in the drawings. Wherever possible, the same reference numbers will be used throughout the drawing(s) and accompanying written description to refer to the same or like parts.

DETAILED DESCRIPTION

Detection and/or control of malware network communications is desirable to prevent the malware network communications from causing damage, interfering with valid network communications, etc. Example methods and apparatus disclosed herein facilitate the detection and control of malware network communications by analyzing headers of network communications to identify network communications that are determined to have a significant risk of being malware network communications. In some examples disclosed herein the network communications are communications using an application layer protocol (e.g., hypertext transport protocol (HTTP) communications) and the disclosed methods and apparatus analyze HTTP header information to identify HTTP communications that are determined to have a significant risk of being malware network communications. For example, the disclosed methods and apparatus may analyze the length of a user agent field of an HTTP header to different between HTTP communications that are a risk and HTTP communications that are not a risk. As disclosed herein, some examples analyze other characteristics of the HTTP header. In some examples disclosed herein, the analysis of the characteristics of the HTTP headers results in scores associated with the characteristics. The scores may be combined to determine a combined score, the combined score may be compared with a threshold, and HTTP communications having a combined score that meets a threshold may be acted upon (e.g., an alert may be generated, the HTTP communications may be blocked, the HTTP communications may be redirected, the HTTP communications may be delayed, etc.).

FIG. 1 is a block diagram of an example system 100 for detecting risks using application layer protocol headers. An example application layer protocol is HTTP. While HTTP is referenced in the examples described herein, headers of any application layer protocol may be used (e.g., real-time transport protocol (RTP), transport layer security (TLS), secure sockets layer (SSL), remote procedure call (RPC), etc.). The example system 100 includes client(s) 102, a network 104, a server 106, and a security agent 108.

The client(s) 102 of the illustrated example send and receive communications via the network 104. The example client(s) 102 send HTTP requests to the server 106 and receive HTTP responses from the server 106. Alternatively, the client(s) 102 could send communications to any other destination. The client(s) 102 may be any type of computing device (e.g., a user computing device, a server, a portable computing device, etc.). Some of the client(s) 102 may send malware communications. For example, the client(s) 102 could be operated by users with malicious intent, could be infected with a virus that allows a person other than users of the client(s) 102 to send communications with a malicious intent, could be improperly configured such that the client(s) 102 send communications having an error, and so forth.

The example network 104 of FIG. 1 communicatively couples the client(s) 102 to other devices and networks. In the illustrated example, the client(s) 102 are communicatively coupled to the server 106 via the network 104 and the security agent 108. The example network 104 is the internet. Alternatively, the network 104 may be any type of network such as a wide area network, a local area network, a wired network, a wireless network, etc. While a single network is illustrated, the system 100 may include any number and types of networks.

The example server 106 of FIG. 1 is a web server that communicates using HTTP. The example server 106 receives HTTP requests (e.g., GET requests, POST requests, etc.) from the client(s) 102 and, in response, transmits web pages using HTTP. The server 106 may alternatively be any other type of server (e.g., an audio server, a video server, a file transfer protocol (FTP) server, a voice telephony server, etc.) and may communicate using any other protocol or combination of protocols.

The example security agent 108 of FIG. 1 receives communications sent from the client(s) 102 to the server 106 and selectively transmits the communications to the server 106 if the security agent 108 determines that HTTP headers of the communications indicate a risk that the communications are malware. The example security agent 108 is a web application firewall. Alternatively, the security agent 108 may be any other device such as, for example, any other type of firewall, a gateway, a router, a server (e.g., a security application executing on the server 106), an intrusion detection/prevention system, a filter, etc. While the example security agent 108 selectively passes communications to the server 106, the security agent 108 may perform any other action(s) such as, for example, delaying communications determined to be malware, transmitting communications to another location/device (e.g., a device that can perform additional analysis and/or be reviewed by an administrator), tagging or labeling communications determined to be malware, etc.

Figure 2:
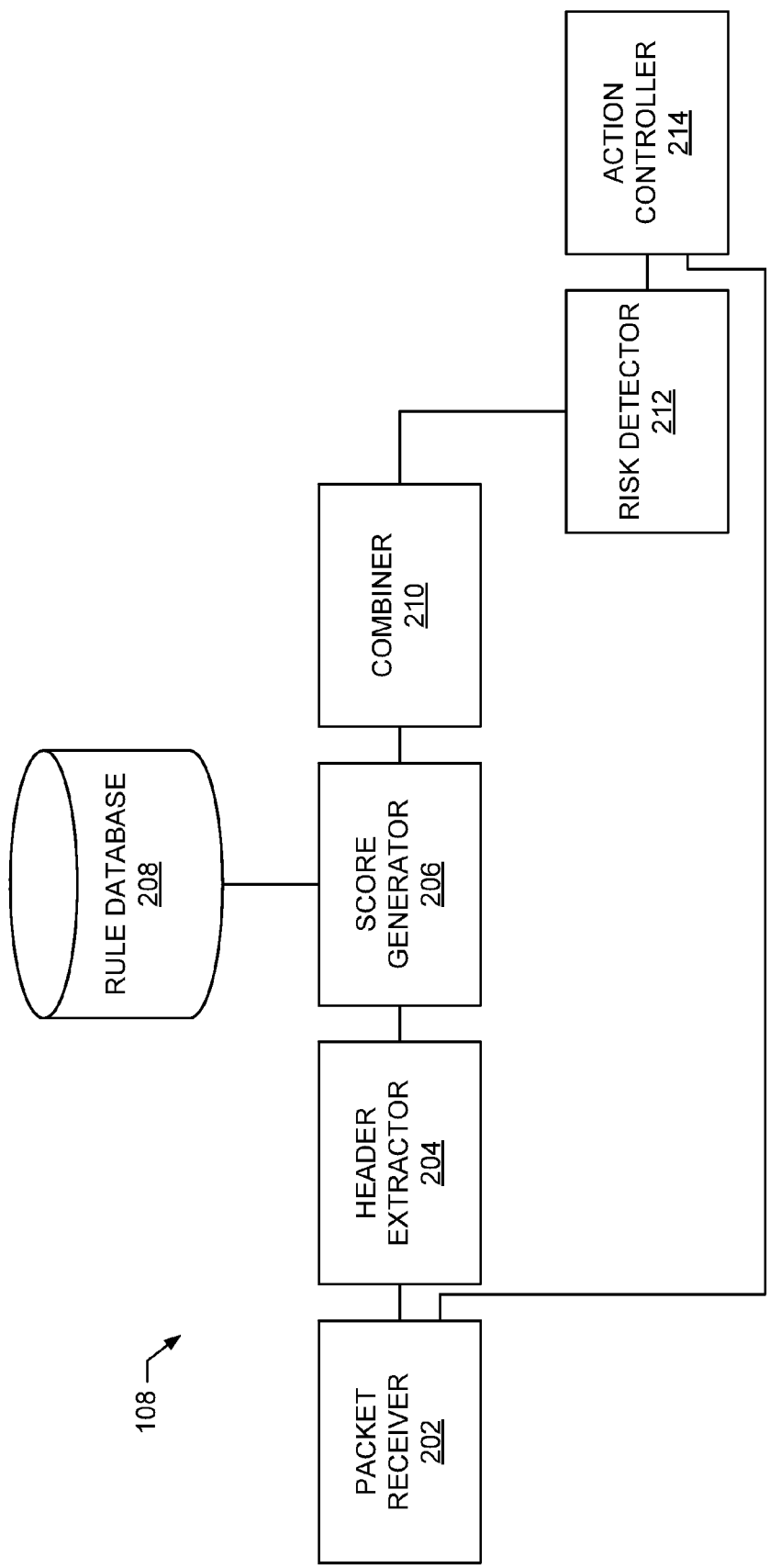
FIG. 2 is a block diagram of an example implementation of the security agent of FIG. 1.

A block diagram of an example implementation of the security agent 108 is illustrated in FIG. 2. The security agent 108 of FIG. 2 includes a packet receiver 202, a header extractor 204, a score generator 206, a rule database 208, a combiner 210, a risk detector 212, and an action controller 214.

The packet receiver 202 of the illustrated example receives communication packets sent by the client(s) 102. The example packet receiver 202 is communicatively coupled with the network 104 of FIG. 1 to receive the communication packets sent by the client(s) 102. Alternatively, the packet receiver 202 could be communicatively coupled to the client(s) 102 in any other manner. The packet receiver 202 transmits the received communication packets to the header extractor 204 and the action controller 214. While, for simplicity, the transmission of communication packets to the client(s) 102 from the server 106 is not illustrated, the packet receiver 202 may additionally transmit communication packets to the client(s) 102 via the network 104.

The example header extractor 204 extracts headers from communication packets received from the packet receiver 202 and transmits the headers to the score generator 206 for analysis. The example header extractor 204 extracts the entire headers (e.g., the HTTP header). Alternatively, the header extractor 204 may extract selected portions of the headers (e.g., portions of the headers to be analyzed by the score generator 206). For example, headers may include a number of fields. An example HTTP request include several header fields is shown in Table 1 below. The example header a User-Agent field, a Host field, and a Pragma field.

TABLE 1

GET / HTTP/1.0
User-Agent: Mozilla/4.0 (compatible; MSIE 6.0;
Windows NT 5.1; SV1)
Host: www.sampleaddress.com
Pragma: no-cache The example score generator 206 receives the headers from the from the header extractor 204 and analyzes the headers using rules stored in the rule database 208 to generate a set of scores associated with the communication packets received by the packet receiver 202. The example score generator 206 iteratively applies rules in the rule database 208 to determine a series of scores that are sent to the combiner 210. The rule database 208 may be any type of data storage such as, for example, a database, a file, a table, etc.

The rules stored in the rule database 208 indicate characteristics of the headers to be analyzed and scoring values associated with those characteristics. The rules may be developed through analysis of experimental data (e.g., communication packets that have already been labeled as malware or non-malware (e.g., by a human reviewer) to determine characteristics of headers that differentiate between malware and non-malware communication packets.

For example, HTTP headers include a user agent field that typically carries information about the application that transmitted the HTTP communication packet. The length of the user agent field can be analyzed to differentiate between malware and non-malware HTTP communication packets. An example rule indicates that the length of the user agent field is scored as: 1.6 for a length between 1 and 20 characters, 1.4 for a length between 21 and 30 characters, 1.1 for a length between 31 and 40 characters, 0.8 for a length between 40 and 70 characters, 0.4 for a length between 71 and 90 characters, and −0.7 for a length between 91 and 1000 characters (e.g., in a system where a higher score increases the risk that the communication packet is malware). Thus, the short the user agent field, the greater the risk that the communication packet is malware. Many other rules may be stored in the rule database 208 and additional rules are described herein.

The combiner 210 of the illustrated example combines the set of scores received from the score generator 206 to determine a single score associated with a communication packet. The example combiner 210 sums the scores to determine a combined score. Alternatively, any other operation for combining the scores may be utilized. The combiner 210 transmits the combined score to the risk detector 212.

The example risk detector 212 analyzes the combined score to analyze a risk that a communication packet is malware. The example risk detector 212 analyzes the risk by comparing the combined score received from the combiner 210 with a threshold. When the combined score meets the threshold, the communication packet under analysis is determined to be malware. In the illustrated example, the combined score meets the threshold when it exceeds the threshold. Alternatively, the combined score meets the threshold when it is equal to the threshold and/or less than the threshold. The risk detector 212 transmits the results of the analysis to the action controller 214.

The example action controller 214 blocks communication packets that are indicated to be malware by the risk detector 212 (e.g., the communication packets received from the packet receiver 202 in parallel with the analysis of the headers of the communication packets). Alternatively, the action controller 214 may perform any other action based on the results of the risk detector 212. For example, the action controller 214 may label communication packets determined to be malware and/or non-malware, may delay communication packets determined to be malware, may forward communication packets to another location, may flag communication packets for human review, may transmit a reset in response to the communication packet, etc. The particular action performed by the action controller 214 may be configured by a user. Additionally, multiple actions may be performed.

While an example manner of implementing the security agent 108 of FIG. 1 is illustrated in FIG. 2, one or more of the elements, processes and/or devices illustrated in FIG. 2 may be combined, divided, re-arranged, omitted, eliminated and/or implemented in any other way. Further, the example packet receiver 202, the example header extractor 204, the example score generator 206, the example rule database 208, the example combiner 210, the example risk detector 212, the example action controller 214 and/or, more generally, the example security agent 108 of FIG. 2 may be implemented by hardware, software, firmware and/or any combination of hardware, software and/or firmware. Thus, for example, any of the example packet receiver 202, the example header extractor 204, the example score generator 206, the example rule database 208, the example combiner 210, the example risk detector 212, the example action controller 214 and/or, more generally, the example security agent 108 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, packet receiver 202, the example header extractor 204, the example score generator 206, the example rule database 208, the example combiner 210, the example risk detector 212, and/or the example action controller 214 are hereby expressly defined to include a tangible computer readable storage device or storage disk such as a memory, a digital versatile disk (DVD), a compact disk (CD), a Blu-ray disk, etc. storing the software and/or firmware. Further still, the example security agent 108 of FIG. 1 may include one or more elements, processes and/or devices in addition to, or instead of, those illustrated in FIG. 2, and/or may include more than one of any or all of the illustrated elements, processes and devices.

Figure 3:
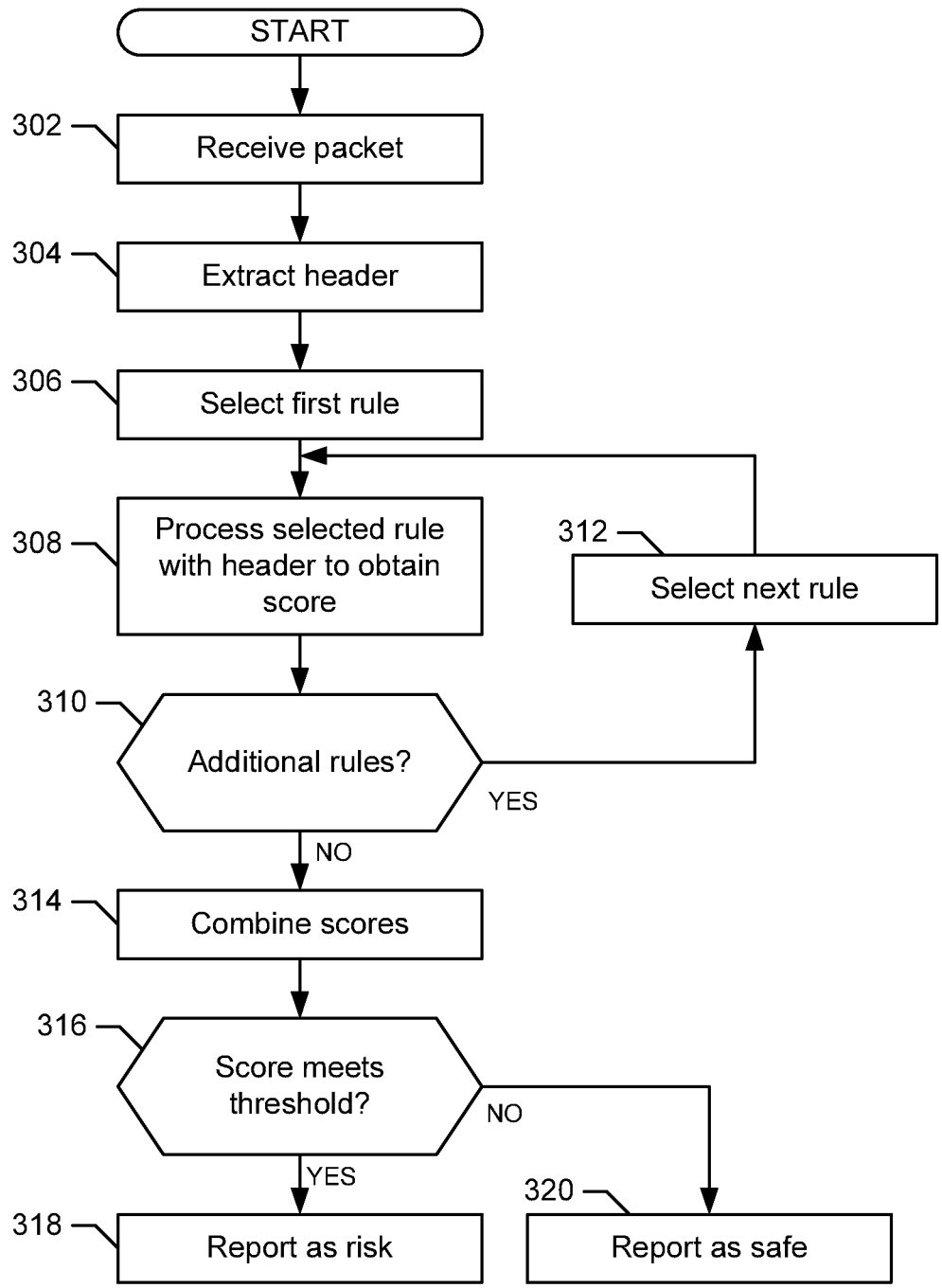
FIG. 3 is a flowchart representative of example machine readable instructions for implementing the security agent of FIG. 1.

A flowchart representative of example machine readable instructions for implementing the security agent 108 of FIG. 1 is shown in FIG. 3. In this example, the machine readable instructions comprise a program for execution by a processor such as the processor 412 shown in the example processor platform 400 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example security agent 108 may alternatively be used. For example, the order of execution of the blocks may be changed, and/or some of the blocks described may be changed, eliminated, or combined.

As mentioned above, the example processes of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program of FIG. 3 begins when the packet receiver 202 of FIG. 2 receives a communication packet (block 302). For example, the communication packet may be an HTTP request sent from one of the client(s) 102 to the server 106. The header extractor 204 extracts a header from the communication packet (block 304). For example, the header extractor 204 may extract the contents of an HTTP header of the communication packet.

The score generator 206 then selects a first rule from the rule database 208 (block 306). The score generator 206 processes the selected rule with the header information extracted by the header extractor 204 to obtain a score (block 308). The score generator 206 determines if there are additional rules in the rule database to be processed (block 310). When there are additional rules to be processed, the score generator 206 selects the next rule (block 312) and control returns to block 308 to process the next rule.

When there are no additional rules to be processed, the combiner 210 combines the scores associated with each of the rules to calculate a combined score for the communication packet (block 314). For example, the combiner 210 may sum the values of the scores determined for each of the rules.

The risk detector 212 then determines if the combined score exceeds a threshold (block 316). For example, the risk detector 212 may compare the combined score to a predetermined threshold, a threshold specified by a user and/or administrator, etc. When the score meets threshold (e.g., any combination of: exceeds the threshold, equals the threshold, or is less than the threshold), the risk detector 212 reports the communication packet as a risk of malware (block 318). When the score does not meet the threshold, the risk detector 212 reports the communication as safe (block 320).

For example, the risk detector 212 may report the determination of malware risk to the action controller 214, which may perform an action based on the determination. For example, when the risk detector 212 determines that the communication packet is a risk of malware, the action controller 214 may prevent the packet from being transmitted to the server 106. Alternatively, in such an example, when the risk detector 212 determines that the communication packet is safe, the action controller 214 may transmit the communication packet to the server 106.

In block 318 and block 320, the risk detector 212 may additionally generate a report indicating the results of the analysis of the headers. An example report for the HTTP communication in Table 2 is show in Table 3.

TABLE 2

POST /webmail/bin/index2.php HTTP/1.0
Accept: image/gif, image/x-xbitmap, image/jpeg, image/pjpeg, */*
Content-Type: application/x-www-form-urlencoded
User-Agent: Mozilla/4.0 (compatible; ICS)
Host: www.samplepage.com
Content-Length: 76

TABLE 3

4.7 - [-] Malicious Header located
    0.4 No Risky File Extension Found Baseline
    0.5 HTTP/1.0 Found
    1.8 FQDN Host Header and HTTP/1.0 Found TABLE 3-continued 1.4 User Agent Length 21 -> 30
0.6 Number of Headers 6 -> 8

In the example of Tables 2 and 3, the combined score for the HTTP communication headers of Table 2 is 4.7. In the example, 4.7 exceeds the threshold for a determination of malware (e.g., 4.0) and thus, the HTTP communication is identified as having a Malicious Header. For example, a baseline value of 0.4 was assigned because no risky file extensions were included in the header, a value of 0.5 was assigned because the HTTP/1.0 version was identified in the header, a value of 1.8 was assigned because the header included a Host field even though a host field is not specified in the standard for HTTP/1.0, a value of 1.4 was assigned because the user agent field was between 21 and 30 characters in length, and a value of 0.6 was assigned because the header include between 6 and 8 separate header fields.

While the program of FIG. 3 is described with reference to the security agent 108 of FIGS. 1 and 2, the program may be executed and/or implemented by any other component and/or device.

Several example rules that may be stored in the rule database 208 and utilized by the score generator 206 (e.g., in block 308 of FIG. 3) and/or more generally by the security agent are now described. The rules may be incorporated into any of the foregoing methods and apparatus.

HTTP headers typically include a user agent field that includes information about the application and/or device transmitting an HTTP request. The length of the user agent field has been found to be useful in differentiating between malware and non-malware HTTP communications. The score generator 206 may, thus, issue a score based on the length of the user agent field. An example rule indicates that the length of the user agent field is scored as: 1.6 for a length between 1 and 20 characters, 1.4 for a length between 21 and 30 characters, 1.1 for a length between 31 and 40 characters, 0.8 for a length between 40 and 70 characters, 0.4 for a length between 71 and 90 characters, and −0.7 for a length between 91 and 1000 characters (e.g., in a system where a higher score increases the risk that the communication packet is malware).

A count of the number of fields found in an HTTP header has been found to be useful in differentiating between malware and non-malware HTTP communications. The score generator 206 may, thus, issue a score based on the number of fields in the HTTP header. An example rule indicates that the number of header fields is scored as: 2.0 for 1 to 3 headers, 1.4 for 4 headers, 1.0 for 5 headers, 0.6 for 6 to 8 headers, −0.5 for 9 to 100 headers (e.g., in a system where a higher score increases the risk that the communication packet is malware).

A rule may assign a score based on the HTTP protocol version identified in an HTTP communication. The score may be assigned based on an HTTP header identifying an HTTP version and including fields that do not correspond to that HTTP version (e.g., the headers do not follow the established standards such as Request For Comments (RFC) standards). For example, a score indicative of malware may be assigned to an HTTP header that identifies the HTTP communication as using HTTP/1.0 but includes a "Host" header field that is not sent in a proper HTTP/1.0 HTTP communication.

A rule may assign a score based on a uniform resource identifier (URI) identified in a header. For example, file extensions that are determined to be more likely to be malware may be assigned a score indicative of malware. For example, a score indicative of malware may be assigned to the following extensions: .jpg, .gif, .exe, .pac, .swf, .cfg, and .bin.

A rule may assign a score based on the presence of a cookie header. For example, a score indicative of malware may be assigned to headers that do not include a cookie header.

A rule may assign a score based on the order of header fields in a communication packet. For example, known applications (e.g., web browsers) list header fields in a particular order. A score indicative of malware may be assigned to headers that includes fields in an order that does not match the order for the application identified in a user agent field of the header. For example, if a particular application is known to list a user agent field as the third field in a header but a communication packet is received having a header that includes the user agent field as the second field in the header, a score indicative of malware may be assigned for the header field ordering rule.

The particular scoring values described herein are examples. Any scoring values may be utilized and associated with an appropriate threshold. For example, while the examples included herein specify greater values for scoring indicating a greater likelihood that a communication packet is malware, lower values may alternatively indicate malware. For example, a score of zero could be neutral, a negative score could be more likely malware and a positive score could be less likely to be malware. In some examples, a score is only given to a rule if the rule indicates some likelihood that the communication packet is malware (e.g., a score of zero is assigned if the rule does not indicate a likelihood of malware). The scoring may be adjusted based on analyzing the results of the methods and apparatus. For example, if the scoring for a particular rule creates too many false positives, the scoring may be adjusted accordingly.

The analysis of headers may be combined with other analyses to determine if a communication packet is malware. For example, the analysis may be supplemented with blacklists of known malicious information and/or whitelists of known safe information. For example, user agent blacklists, filename blacklists, URI blacklists, domain name blacklists, top level domain (TLD) blacklists, etc. Third party reporting services may be consulted. For example, the analysis may include geographical internet protocol information (GEOip), information contained in WHOIS data, blacklist and whitelist services (e.g., real-time blacklist (RBL) services), internet protocol reputation listings, etc.

Figure 4:
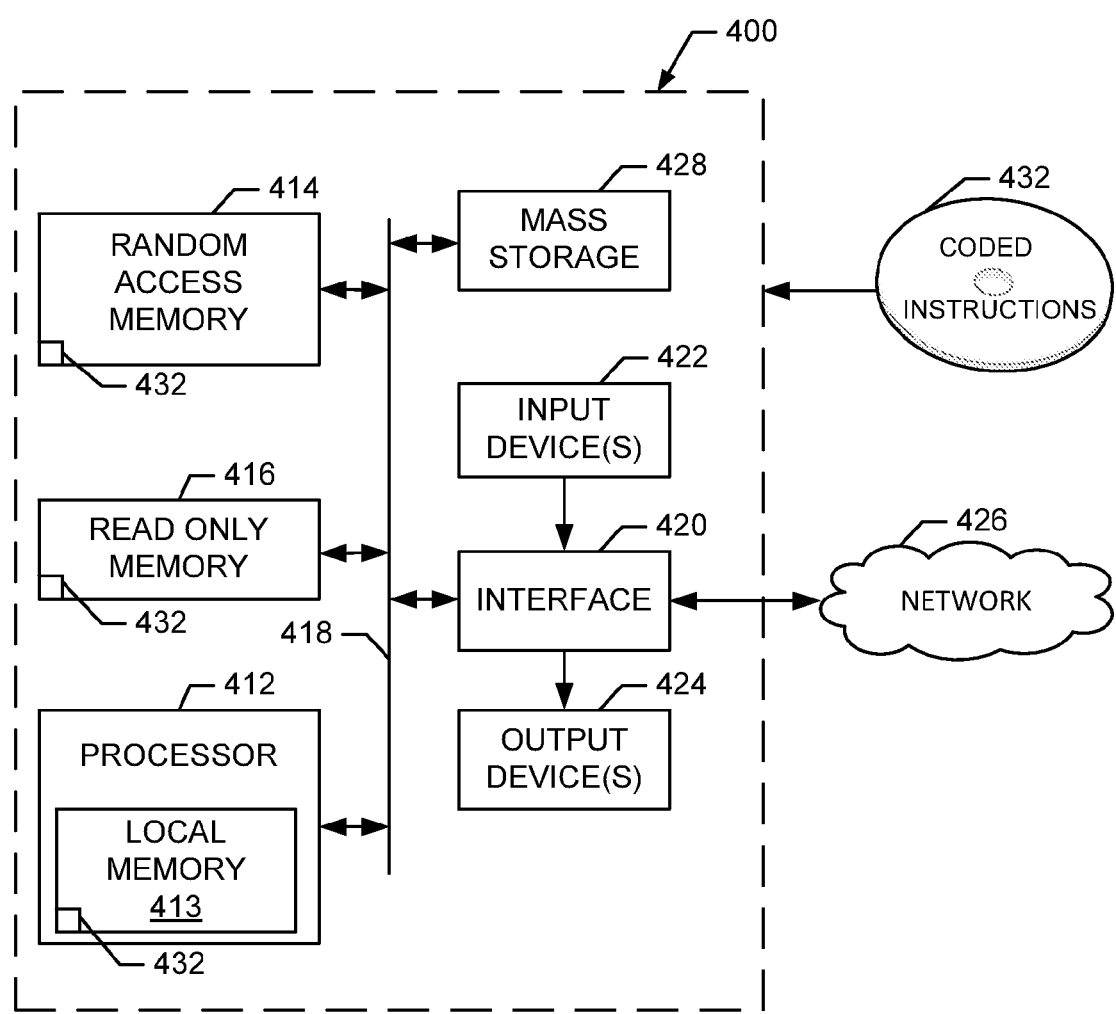
FIG. 4 is a block diagram of an example processor platform capable of executing the instructions of FIG. 3 to implement the security agent of FIGS. 1 and/or 2.

FIG. 4 is a block diagram of an example processor platform 400 capable of executing the instructions of FIG. 3 to implement the security agent 108 of FIGS. 1 and/or 2. The processor platform 400 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example includes a processor 412. The processor 412 of the illustrated example is hardware. For example, the processor 412 can be implemented by one or more integrated circuits, logic circuits, microprocessors or controllers from any desired family or manufacturer.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM)

and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example, one or more input devices 422 are connected to the interface circuit 420. The input device(s) 422 permit(s) a user to enter data and commands into the processor 1012. The input device(s) can be implemented by, for example, a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

The coded instructions 432 of FIG. 3 may be stored in the mass storage device 428, in the volatile memory 414, in the non-volatile memory 416, and/or on a removable tangible computer readable storage medium such as a CD or DVD.

From the foregoing, it will appreciate that the above disclosed methods, apparatus and articles of manufacture facilitate detection of malware communications. By detecting malware communications and, for example, blocking the malware communications, servers and other computing devices can be detected from the harm caused by such malware communications.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to analyze network communications, the method comprising:
    extracting characteristics from a header of a received hypertext transport protocol (HTTP) request;
    determining a length of a user agent field of the header as a first characteristic of the characteristics;
    determining, via a processor, a first score as a first value when the length of the user agent field is less than a length threshold, wherein the first value indicates that the received HTTP request is more likely to be malware;
    determining a second score corresponding to a second characteristic of the characteristics;
    adding the first score and the second score to determine a combined score; and
    indicating that the received HTTP request is malware when the combined score meets a threshold.

2. A method as defined in claim 1, further including:
    determining a number of fields in the header;
    determining the second score as a first value for the second score when the number of fields is less than a number threshold; and
    determining the second score as a second value for the second score when the number of fields is greater than the number threshold, wherein the first value for the second score indicates that the received HTTP request is more likely to be malware than the second value for the second score.

3. A method as defined in claim 1, further including:
    determining a protocol version identified in the header;
    determining the second score as a first value for the second score when the header includes a field not associated with the protocol version; and
    determining the second score as a second value for the second score when the header does not include fields that are not associated with the protocol version, wherein the first value for the second score indicates that the received HTTP request is more likely to be malware than the second value for the second score.

4. A method as defined in claim 1, further including:
    determining if the header identifies a uniform resource identifier having a file extension identified as being more likely to be associated with malware;
    determining the second score as a first value for the second score when the header identifies the file extension; and
    determining the second score as a second value for the second score when the header does not identify the file extension, wherein the first value for the second score indicates that the received HTTP request is more likely to be malware than the second value for the second score.

5. A method as defined in claim 1, further including:
    determining if the header identifies a cookie;
    determining the second score as a first value for the second score when the header identifies the cookie; and
    determining the second score as a second value for the second score when the header does not include the cookie, wherein the first value for the second score indicates that the received HTTP request is more likely to be malware than the second value for the second score.

6. A method as defined in claim 1, further including:
    determining an application that sent the received HTTP request based on a user agent field of the header;
    determining a known ordering of header fields associated with the application;
    determining the second score as a first value for the second score when an order of fields of the header of the received HTTP request does not match the known ordering; and
    determining the second score as a second value for the second score when the order of the fields of the header of the received HTTP request matches the known ordering, wherein the first value for the second score indicates that the received HTTP request is more likely to be malware than the second value for the second score.

7. A method as defined in claim 1, wherein the received HTTP request utilizes secure socket layer.

8. A method as defined in claim 1, further including, in response to indicating that the received HTTP request is malware, preventing the received HTTP request from reaching a destination identified in the received HTTP request.

9. A method as defined in claim 1, the method further including:
determining the first score as a second value when length of the user agent field is greater than the length threshold.

10. An apparatus to analyze network communications, the apparatus comprising:
a header extractor to extract characteristics from a header of a received hypertext transport protocol (HTTP) request, wherein a user agent field is a first characteristic of the characteristics;
a score generator to determine a first score as a first value when a length of the user agent field is less than a length threshold, wherein the first value indicates that the received HTTP request is more likely to be malware, determine a second score corresponding to a second characteristic of the characteristics;
adding the first score and the second score to determine a combined score;
a combiner to add the first score and the second score to determine a combined score; and
a risk detector to indicate that the received HTTP request is malware when the combined score meets a threshold, wherein at least one of the header extractor, the score generator, or the risk detector is implemented via a logic circuit.

11. An apparatus as defined in claim 10, the score generator is to determine the second score by:
determining a number of fields in the header;
determining the second score as a first value for the second score when the number of fields is less than a number threshold; and
determining the second score as a second value for the second score when the number of fields is greater than the number threshold, wherein the first value for the second score indicates that the received HTTP request is more likely to be malware than the second value for the second score.

12. An apparatus as defined in claim 10, the score generator is to determine the second score by:
determining a protocol version identified in the header;
determining the second score as a first value for the second score when the header includes a field not associated with the protocol version; and
determining the second score as a second value for the second score when the header does not include fields that are not associated with the protocol version, wherein the first value for the second score indicates that the received HTTP request is more likely to be malware than the second value for the second score.

13. An apparatus as defined in claim 10, the score generator is to determine the second score by:
determining if the header identifies a uniform resource identifier having a file extension identified as being more likely to be associated with malware;
determining the second score as a first value for the second score when the header identifies the file extension; and
determining the second score as a second value for the second score when the header does not identify the file extension, wherein the first value for the second score indicates that the received HTTP request is more likely to be malware than the second value for the second score.

14. An apparatus as defined in claim 10, the score generator is to determine the second score by:
determining if the header identifies a cookie;
determining the second score as a first value for the second score when the header identifies the cookie; and
determining the second score as a second value for the second score when the header does not include the cookie, wherein the first value for the second score indicates that the received HTTP request is more likely to be malware than the second value for the second score.

15. An apparatus as defined in claim 10, the score generator is to determine the second score by:
determining an application that sent the received HTTP request based on a user agent field of the header;
determining a known ordering of header fields associated with the application;
determining the second score as a first value for the second score when an order of fields of the header of the received HTTP request does not match the known ordering; and
determining the second score as a second value for the second score when the order of the fields of the header of the received HTTP request matches the known ordering, wherein the first value for the second score indicates that the received HTTP request is more likely to be malware than the second value for the second score.

16. An apparatus as defined in claim 10, wherein the received HTTP request utilizes secure socket layer.

17. An apparatus as defined in claim 10, an action controller to, in response to the risk detector indicating that the received HTTP request is malware, prevent the received HTTP request from reaching a destination identified in the received HTTP request.

18. An apparatus as defined in claim 10, wherein the score generator is further to:
determine the first score as a second value when length of the user agent field is greater than the length threshold.

19. A tangible computer readable storage medium including instructions that, when executed, cause a machine to at least:
extract characteristics from a header of a received hypertext transport protocol (HTTP) request, wherein a user agent field of the header is a first characteristic of the characteristics;
determine a length of the user agent field of the header;
determine a first score as a first value when the length of the user agent field is less than a length threshold, wherein the first value indicates that the received HTTP request is more likely to be malware;
determine a second score corresponding to a second characteristic of the characteristics;
add the first score and the second score to determine a combined score; and
indicate that the received HTTP request is malware when the combined score meets a threshold.

20. A tangible computer readable storage medium as defined in claim 19, wherein the instructions cause the machine to determine the second score by:
determining a number of fields in the header;
determining the second score as a first value for the second score when the number of fields is less than a number threshold; and
determining the first score as a second value for the second score when the number of fields is greater than the number threshold, wherein the first value for the second score indicates that the received HTTP request is more likely to be malware than the second value for the second score.

21. A tangible computer readable storage medium as defined in claim 19, wherein the instructions cause the machine to determine the second score by:
   determining a protocol version identified in the header;
   determining the second score as a first value for the second score when the header includes a field not associated with the protocol version; and
   determining the second score as a second value for the second score when the header does not include fields that are not associated with the protocol version, wherein the first value for the second score indicates that the received HTTP request is more likely to be malware than the second value for the second score.

22. A tangible computer readable storage medium as defined in claim 19, wherein the instructions cause the machine to determine the second score by:
   determining if the header identifies a uniform resource identifier having a file extension identified as being more likely to be associated with malware;
   determining the second score as a first value for the second score when the header identifies the file extension; and
   determining the second score as a second value for the second score when the header does not identify the file extension, wherein the first value for the second score indicates that the received HTTP request is more likely to be malware than the second value for the second score.

23. A tangible computer readable storage medium as defined in claim 19, wherein the instructions cause the machine to determine the second score by:
   determining if the header identifies a cookie;
   determining the second score as a first value for the second score when the header identifies the cookie; and
   determining the second score as a second value for the second score when the header does not include the cookie, wherein the first value for the second score indicates that the received HTTP request is more likely to be malware than the second value for the second score.

24. A tangible computer readable storage medium as defined in claim 19, wherein the instructions cause the machine to determine the second score by:
   determining an application that sent the received HTTP request based on a user agent field of the header;
   determining a known ordering of header fields associated with the application;
   determining the second score as a first value for the second score when an order of fields of the header of the received HTTP request does not match the known ordering; and
   determining the second score as a second value for the second score when the order of the fields of the header of the received HTTP request matches the known ordering, wherein the first value for the second score indicates that the received HTTP request is more likely to be malware than the second value for the second score.

25. A tangible computer readable storage medium as defined in claim 19, wherein the received HTTP request utilizes secure socket layer.

26. A tangible computer readable medium as defined in claim 19, wherein the instructions, when executed, cause the machine to, in response to indicating that the received HTTP request is malware, prevent the received HTTP request from reaching a destination identified in the received HTTP request.

27. A tangible computer readable medium as defined in claim 19, wherein the instructions, when executed cause the machine to:
   determine the first score as a second value when length of the user agent field is greater than the length threshold.

* * * * *